(12) United States Patent
Sarwer et al.

(10) Patent No.: US 10,855,998 B1
(45) Date of Patent: Dec. 1, 2020

(54) EMBEDDED CODEC CIRCUITRY FOR BLOCK BASED GAMMA CORRECTION OF A RAW IMAGE BLOCK

(71) Applicant: SONY CORPORATION, Tokyo (JP)

(72) Inventors: Mohammed Golam Sarwer, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/458,490

(22) Filed: Jul. 1, 2019

(51) Int. Cl.
| | |
|---|---|
| *H04N 19/176* | (2014.01) |
| *H04N 9/69* | (2006.01) |
| *H04N 19/103* | (2014.01) |
| *H04N 19/186* | (2014.01) |
| *H04N 19/13* | (2014.01) |
| *H04N 19/196* | (2014.01) |
| *H04N 9/04* | (2006.01) |

(52) U.S. Cl.
CPC ......... *H04N 19/176* (2014.11); *H04N 9/0455* (2018.08); *H04N 9/69* (2013.01); *H04N 19/103* (2014.11); *H04N 19/13* (2014.11); *H04N 19/186* (2014.11); *H04N 19/196* (2014.11)

(58) Field of Classification Search
CPC ...... H04N 9/69; H04N 19/176; H04N 19/103; H04N 19/186; H04N 19/13; H04N 19/196; H04N 9/0455
See application file for complete search history.

(56) References Cited

U.S. PATENT DOCUMENTS

| | | | |
|---|---|---|---|
| 7,656,561 B2 | 2/2010 | Molgaard et al. | |
| 8,111,333 B2 | 2/2012 | Luo | |
| 10,560,674 B2 * | 2/2020 | Tsukagoshi | ............ H04N 21/84 |
| 2017/0070718 A1 | 3/2017 | Baqai et al. | |

OTHER PUBLICATIONS

Suk Hwan Lim, "Characterization of Noise in Digital Photographs for Image Processing", IS&T/SPIE Electronic Imaging, vol. 6069, Oct. 21, 2008, 11 pages.

Iseghem, et al., "Building JPEG/Motion JPEG Into the Security Camera", EE Times, https://www.eetimes.com/document.asp?doc_id=1273561#, Apr. 15, 2005, 07 pages.

* cited by examiner

*Primary Examiner* — Christopher K Peterson
(74) *Attorney, Agent, or Firm* — Chip Law Group

(57) ABSTRACT

An embedded codec (EBC) circuitry includes encoder circuitry that determines a value of a selection parameter for each image block of a plurality of image blocks. A first image block is selected from the plurality of image blocks, based on the value of the selection parameter of the first image block that is greater than a threshold value. A gamma corrected image block is generated by application of a gamma correction scheme on the selected first image block. The application of the gamma correction scheme increases a number of bits required to encode the plurality of input pixel values in the selected first image block. A bit-stream of the gamma corrected image block is generated by application of an encoding scheme on the gamma corrected image block.

20 Claims, 6 Drawing Sheets

US 10,855,998 B1

EMBEDDED CODEC CIRCUITRY FOR BLOCK BASED GAMMA CORRECTION OF A RAW IMAGE BLOCK

REFERENCE

None.

FIELD

Various embodiments of the disclosure relate to image and video compression or decompression technologies. More specifically, various embodiments of the disclosure relate to embedded codec circuitry for block based gamma correction of a raw image block.

BACKGROUND

With recent advancements in imaging technologies, there is an increasing demand for on-chip codecs in image capturing and display devices that can handle compression and storage of different images or video for a wide variety of image resolutions (e.g., low to high resolution images/ video). Currently, an image or a video captured by an image sensor may be subjected to multiple coding techniques, for example, transform coding, entropy coding, residual prediction, quantization, and the like, to achieve a desired compression. Typically, all image blocks within a captured image may be encoded for compression. In certain scenarios, a gamma correction scheme may be applied on all the image blocks prior to encoding operation. In such scenarios, processing every image block with the gamma correction scheme, may result in compression inefficiency, sub-optimal memory usage, and/or adversely impact quality of encoded image, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for block based gamma correction of a raw image block are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for block based gamma correction of a raw image block. The EBC circuitry may include encoder circuitry that handles generation of an encoded bit-stream of a gamma corrected image block. The disclosed EBC circuitry selects an image block from a plurality of image blocks of an image based on a value of a selection parameter of the image block. The selection parameter may define variation in the pixel values of the image block. In accordance with an embodiment, the selection parameter may be a statistical measure, such as a sum of differences between consecutive pixel values of the image block. An image block that has the value of the selection parameter higher than a specified threshold value, may be selected for application of a gamma correction scheme. The selected image block may represent a visually more relevant area of the image than non-selected image blocks, as the variation in the pixel values exceeds the threshold value. In the gamma correction scheme, the pixel values within the image block may be increased based on a gamma parameter value, to ensure that the visually more relevant area is encoded with a higher number of bits. The selective application of the gamma correction scheme at the block level improves the details of the visually more relevant area of the image. As a result of such selective application of gamma correction at the block level, compression efficiency is significantly improved without an adverse impact on quality of encoded image. Further, an area efficiency with respect to throughput of the disclosed EBC circuitry is enhanced and an on-chip memory usage is optimized.

Figure 1:
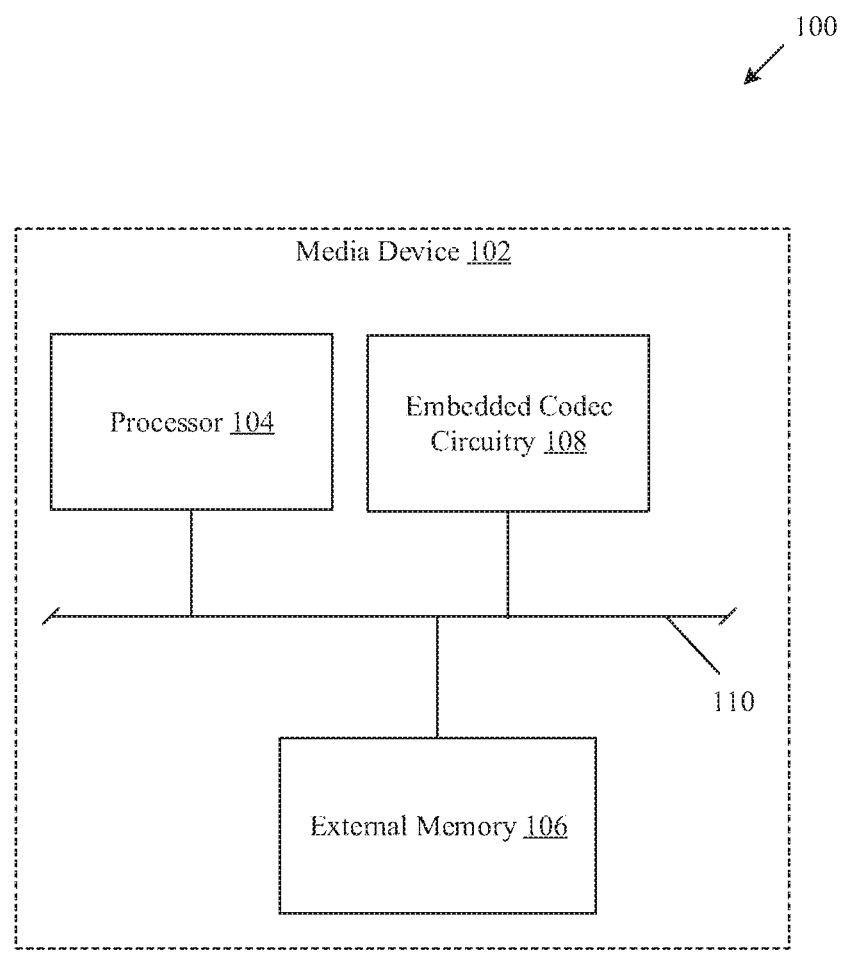
FIG. 1 is a block diagram that illustrates an exemplary media device with an embedded codec (EBC) circuitry and other circuitries for block based gamma correction of a raw image block, in accordance with an embodiment of the disclosure.

FIG. 1 is a block diagram that illustrates an exemplary media device with an embedded codec (EBC) circuitry and other circuitries for block based gamma correction of a raw image block, in accordance with an embodiment of the disclosure. With reference to FIG. 1, there is shown a media device 102 that includes a processor 104, an external memory 106, and an embedded codec (EBC) circuitry 108. Although not shown in FIG. 1, the EBC circuitry 108 may also include an image sensor. In some embodiments, the image sensor may be communicatively coupled to the processor 104, the EBC circuitry 108, and the external memory 106. There is further shown a system bus 110 that interconnects the processor 104, the EBC circuitry 108, and the external memory 106.

The media device 102 may comprise suitable logic, circuitry, and interfaces that may be configured to store uncompressed raw images and/or videos as encoded (i.e. compressed) images and/or videos in the external memory 106. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for offline (without the need for Internet/network) processing and compression/decompression of images/video. In some embodiments, the media device 102 may also include one or more image sensors (such as the image sensor) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

Although not shown in FIG. 1, the EBC circuitry 108 may include an image sensor that may be configured to capture a raw uncompressed image or a sequence of raw uncompressed images of a scene in a field-of-view (FOV) of the image sensor. The raw uncompressed image or the sequence of raw uncompressed images may then be processed by the EBC circuitry 108 to achieve desired compression ratio. The detailed description of the image sensor has been provided in FIG. 2 of the disclosure.

The processor 104 may comprise suitable logic, circuitry, and interfaces that may be configured to execute instructions stored in a dedicated memory (e.g., the external memory 106 or an on-chip memory in the EBC circuitry 108). The processor 104 may be implemented based on a number of processor technologies known in the art. Examples of the processor 104 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to execute a gamma correction scheme on an image block (e.g., a 16×1, an 8×1 image block, or an 8×4 image block) as per a specific gamma parameter. The image block may be one of a one-dimensional (1D) or a two-dimensional (2D) image block. The EBC circuitry 108 may be further configured to encode the corrected image block as per a specific compression factor, based on instructions received at the EBC circuitry 108. In some embodiments, the image block may be part of an input image (i.e. a raw uncompressed image) or a pixel array (row or column) retrieved directly from a read out register of the image sensor, following a row-wise or a column-wise scan by the image sensor. The EBC circuitry 108 may further manage storage of a bit-stream of encoded image block in the external memory 106 or may manage transfer of the bit-stream of encoded image to other media devices via dedicated communication networks.

The EBC circuitry 108 may be implemented as a specialized hardware encoder/decoder that interfaces with the other computational circuitry of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with an embodiment, the EBC circuitry 108 may be implemented in the image sensor (such as a CMOS image sensor). In accordance with another embodiment, the EBC circuitry 108 may also interface with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 106 may comprise suitable logic, circuitry, and interfaces that may be configured to store an input image (uncompressed raw or encoded) or a sequence of input images. The external memory 106 may be further configured to act as an image buffer to store raw uncompressed image blocks retrieved directly from the image sensor. Additionally, the external memory 106 may store instructions associated with sequential encoding/decoding schemes that may be selectively applied, by the EBC circuitry 108, to generate the bit-stream of encoded image block. In an exemplary embodiment, the external memory 106 may be a persistent storage memory or a dynamic random access memory (DRAM) that may be externally interfaced with the EBC circuitry 108. In another exemplary embodiment, the external memory 106 may be static random access memory (SRAM) circuits that may be externally interfaced with the EBC circuitry 108. Further examples of implementation of the external memory 106 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFavs, and the like.

The system bus 110 may be a hardware bus that may include a set of data channels (or conductive paths) to different components of the media device 102. Alternatively stated, the system bus 110 may interconnect at least data ports, address ports, and control signal ports of different components of the media device 102. For example, the system bus 110 may interconnect the processor 104, the EBC circuitry 108, the external memory 106, and other circuitries to each other. The system bus 110 may be configured to facilitate a serial data communication or parallelized data communication between different components on-board the media device 102. Examples of the system bus 110 may include an 8-bit parallel single system bus, a 16-bit parallel single system bus, a 32-bit parallel single system bus, a 64-bit parallel single system bus, a serial data bus, and the like.

In operation, the EBC circuitry 108 may be configured to partition an image or a sequence of images into a plurality of image blocks. In some embodiments, the plurality of image blocks may be acquired by a progressive scan of a plurality of pixel sensors in the on-chip image sensor of the media device 102. In some embodiments, the EBC circuitry 108 may be configured to receive the plurality of image blocks as a sequence of image blocks directly from the read out register of the on-chip image sensor or from the external memory 106.

The block size of the image block may be specified prior to partitioning. Each image block, for example, a "4×1" or a "4×2" image block, may include a plurality of pixel values. The plurality of pixel values may correspond to different color components of a defined color model, for example a RGB color model. In accordance with the human visual system (HVS), the human eye perceives an image region, where sharp change in pixel values is observed and such image region may be categorized as a visually relevant area or a visually important area. Therefore, the image block, which may correspond to the visually important area, requires to be gamma corrected or in other words, encoded with a greater number of bits as compared to a visually less relevant or a visually less important area. The gamma correction may be a non-linear operation on the image block required to encode the image block. The gamma correction may increase input pixel values of the image block so that a number of bits in the encoded image block also increases as compared to the visually less relevant or a visually less important area. This improves the visual quality of the visually relevant area or a visually important area.

In order to gamma correct the image block, the EBC circuitry 108 may be further configured to determine a value of a selection parameter for the image block. The selection parameters can be derived from the contents of the image block. One example of the selection parameter may be a sum of absolute differences between consecutive pixel values in the image block. The EBC circuitry 108 may be configured to select the image block for gamma correction in a case where the value of the selection parameter exceeds a threshold value. In other words, the difference between consecutive pixel values in the image block may be greater than the threshold value, and the image block may be a visually important block. The visually important block may represent image region which may be more sensitive according to the human visual system, as differences in pixel values are comparatively higher than other image regions. Thus, alternatively stated, one or more blocks from the plurality of image blocks may be selected based on a statistical measure for variations in pixel values in each image block. The statistical measure may be a sum of absolute differences between consecutive pixel values in the image block. In some embodiments, the statistical measure may be a variance or a standard deviation of pixel values in the image block.

The EBC circuitry 108 may be further configured to apply a gamma correction scheme on the selected image block. In the gamma correction scheme, the pixel values within the image block may be adjusted based on a specified gamma parameter. The gamma parameter indicates (or may be) a non-linear relationship between the input pixel values and the output pixel values. Alternatively stated, the input pixel values may be raised to the power of gamma parameter to obtain the output pixel values. In a scenario, in which the gamma parameter may be greater than '1', the output pixel values may increase with respect to the input pixel values. As the selected image block represents visually relevant block, increasing the pixel values in such image block may also increase the number of bits required to encode. Thus, the application of the gamma correction scheme on the visually relevant block provides enhanced image quality by increasing the number of bits. The EBC circuitry 108 may be configured to generate a gamma corrected image block based on the application of the gamma correction scheme. The gamma corrected image block may include the adjusted pixel values.

The EBC circuitry 108 may be configured to allocate a signaling bit to each image block of the plurality of image blocks, to indicate whether the gamma correction scheme has been applied on the image block or not. For example, a "0" binary value may be assigned to the signaling bit for the image block if the gamma correction is not applied, and a "1" binary value may be assigned to the signaling bit for the image block if the gamma correction scheme is applied. The EBC circuitry 108 may utilize the allocated signaling bit at the decoder stage to identify the image block on which the gamma correction has been applied, to execute inverse gamma correction on that image block.

The EBC circuitry 108 may be further configured to execute a sequential encoding scheme on the gamma corrected image block and the non-gamma corrected image blocks of the plurality of image blocks. An encoded bit-stream may be generated for the plurality of image blocks, based on the application of the sequential encoding scheme. The non-gamma corrected image blocks may be the remaining image blocks of the plurality of image blocks that are not selected for gamma correction, and thus not gamma corrected before encoding to generate the encoded bit-stream of the plurality of image blocks. In one implementation, the sequential encoding scheme may include a sequential application of a quantization scheme, followed by an entropy coding scheme. In another implementation, the sequential encoding scheme may include a sequential application of a quantization scheme, followed by a residual prediction scheme, and an entropy coding scheme. The number of bits for the gamma corrected image block in the encoded bit-stream, may be higher than the number of bits for the non-gamma corrected image block. The higher number of bits for visually relevant area provides enhanced image quality. At the same time, the number of bits for the non-gamma corrected image block (visually less relevant or important) may remain unchanged. Thus, the selective application of the gamma correction scheme prior to encoding improves the overall image quality without having an adverse impact on the compression efficiency.

In accordance with another embodiment, an EBC decoder circuit (not shown in FIG. 1) of the EBC circuitry 108 may be configured to pre-store different coding tables (e.g., custom coding tables for Huffman encoding schemes, Exponential-Golomb encoding schemes, or signaling bit tables) and quantization tables. Therefore, the encoded bit-stream of the plurality of image blocks need not include different coding tables and quantization tables.

In accordance with an embodiment, the EBC circuitry 108 may be configured to generate the encoded bit-stream of the plurality of image blocks such that the bit-stream may be decodable by different external decoders that may utilize different decoding schemes to decode the encoded bit-stream of the plurality of image blocks block. In such a case, the EBC circuitry 108 may be configured to add different coding tables (e.g., custom coding tables for Huffman encoding schemes, Exponential-Golomb encoding schemes, or signaling bit tables) and quantization tables, in header information or a different meta-stream associated with the encoded bit-stream. By addition of such custom tables and quantization tables in the encoded bit-stream, the output of the EBC circuitry 108 may be decodable by other decoder circuitries.

In accordance with an embodiment, the encoded bit-stream of the plurality of image blocks may be stored as part of an input image (such as a 2D image), a complete image, or a video portion, in the memory, such as the external memory 106 or an on-chip memory in the EBC circuitry 108. In one implementation, the processor 104 may be configured to transfer the encoded bit-stream of the plurality of image blocks, via the system bus 110, to a frame buffer (or a frame store) of a display circuitry (e.g., a video card) communicatively interfaced with the system bus 110 of the media device 102. The frame buffer may act as a compressed frame buffer for the display circuitry. The display circuitry (not shown in FIG. 1) may decode and further utilize the encoded bit-stream of the plurality of image blocks to display a patch of image at the media device 102. In another implementation, the processor 104 may be configured to transfer the encoded bit-stream of the plurality of image blocks, via the system bus 110, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the image block may correspond to a 1D/2D array of pixel values that are directly received from a read-out register of a CMOS sensor in the camera. In a specific scenario, the EBC circuitry 108 may be implemented in the CMOS sensor circuitry.

Figure 2:
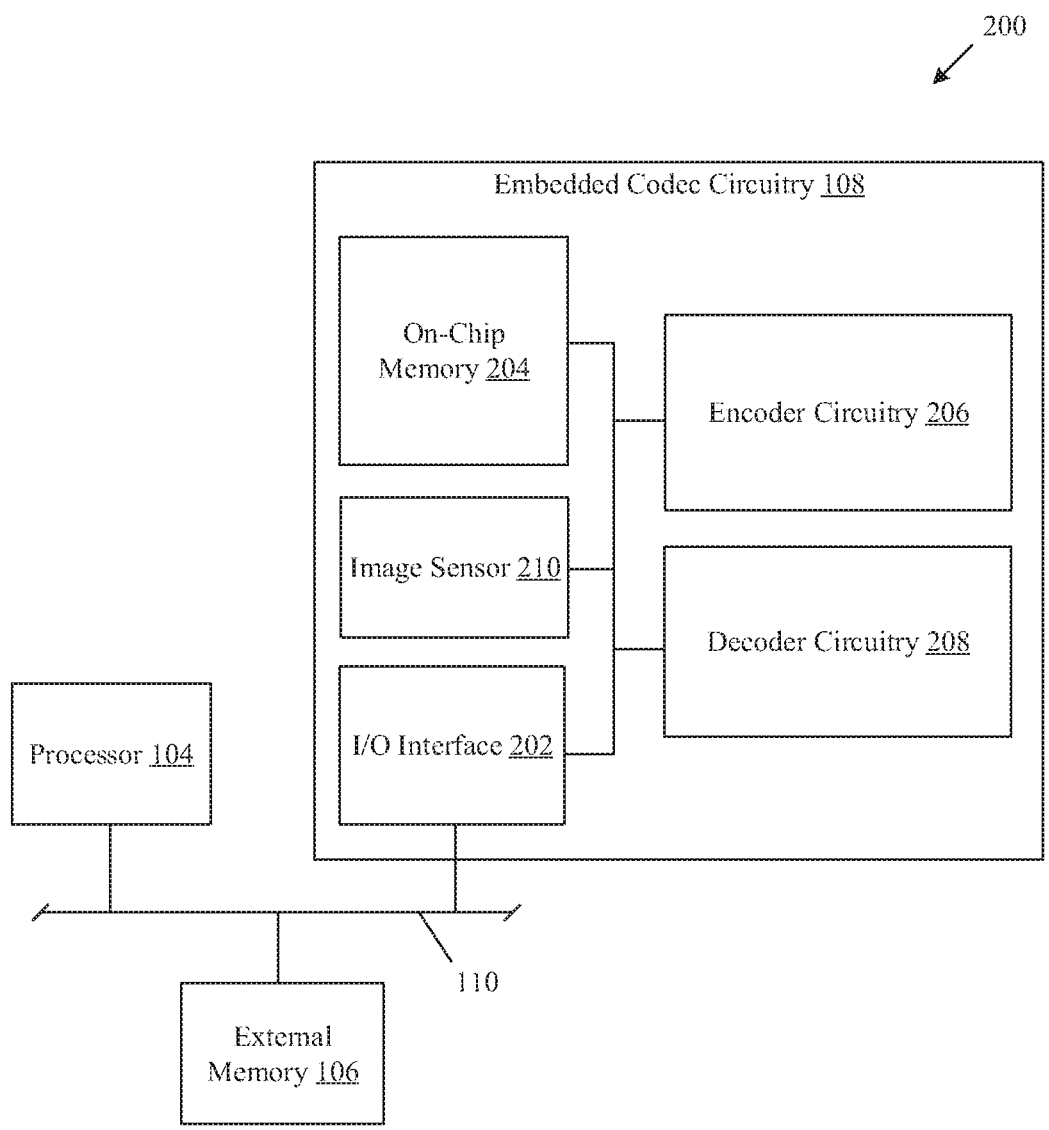
FIG. 2 is a block diagram that illustrates the EBC circuitry of FIG. 1 with various peripheral components for block based gamma correction of a raw image block, in accordance with an embodiment of the disclosure.

FIG. 2 is a block diagram that illustrates an embedded codec (EBC) circuitry with various peripheral components for block-based gamma correction of a raw image block, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, a decoder circuitry 208, and an image sensor 210. In the block diagram 200, there is also shown the processor 104 and the external memory 106 communicatively coupled to the EBC circuitry 108, via the system bus 110. In some embodiments, the processor 104 and the external memory 106 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 110, for example, the external memory 106, or the processor 104. The communication data may include a bit-stream of encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, etc.) that may be utilized by different components of the EBC circuitry 108 to encode the image block. Examples of the operational data stored in the on-chip memory 204 may include, but are not limited to, a bit-stream of encoded image block, transform-domain data, quantized levels, quantized-transformed levels, quantized prediction residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of each image block of a plurality of image blocks by application of a sequential encoding scheme on the plurality of image blocks. The encoder circuitry 206 may also select an image block from the plurality of image blocks, for gamma correction. The encoder circuitry 206 may apply a gamma correction scheme on the selected image block, followed by the sequential encoding scheme. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode the bit-stream of each image block of the plurality of image blocks. The decoder circuitry 208 may be further configured to check a signaling bit (associated with each image block) to apply inverse gamma correction scheme, prior to decoding. In some embodiments, the decoder circuitry 208 may have pre-stored quantization tables and coding tables that may act as a reference for the decoder circuitry 208 to decode the bit-stream. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In other embodiments, the decoder circuitry 208 may be implemented as a combination of hardware and stored set of instructions in the on-chip memory 204 (for example, instructions based on VHDL or HDL logic).

The image sensor 210 may comprise suitable logic, circuitry, and interfaces that may be configured to capture a raw uncompressed image or a sequence of raw uncompressed images of a scene in a field-of-view (FOV) of the image sensor. The image sensor 210 may be implemented as an active pixel sensor, such as a complementary-metal-oxide semiconductor (CMOS) sensor. The image sensor 210 may include a plurality of pixel sensors in a pixel array. In such implementation, the image sensor 210 may be configured to execute progressive scan (line-by-line) of each row or column of pixel sensors (1D/2D pixel-array) on a sensor core of the CMOS sensor. The progressive scan may be a vertical scan (column wise) or a horizontal scan (row wise). In some embodiments, instead of an active pixel sensor, the image sensor 210 may be implemented as one of a passive pixel sensor (such as a charged coupled device (CCD) sensor, an oversampled binary image sensor, a planar Fourier capture array (PFCA), a back-illuminated (BSI or BI) sensor, and the like.

Although not shown in FIG. 2, the image sensor 210 may also include a color filter array (CFA) on the plurality of pixel sensors in the pixel array. The CFA may include a color filter component on each pixel sensor of the plurality of pixel sensors, which may allow a particular wavelength of light to incident on the pixel sensor. For example, a red filter component may allow only the red component of the light to incident on the pixel sensor. The CFA may be, but is not limited to, a bayer filter i.e., a 2×2 block includes '2' green color components, '1' red color component, and '1' blue color component. In some embodiments, the CFA may be, but is not limited to, a RGBE filter in which '1' green color component (out of '2' green color components of the bayer filter) may be modified to emerald color component. The image block may include a pixel value corresponding to each color filter component on the row or column of pixel sensors. For example, a row wise progressive scan of a "4×4" pixel array, with a "4×4" bayer filter, may result into four "4×1" image blocks. Each "4×1" image block may include pixel values corresponding to '2' green color components, '1' red color component, and '1' blue color component.

In operation, a plurality of image blocks may be acquired from an image captured by the image sensor, such as the image sensor 210. The plurality of image blocks may be acquired by the progressive scan of the plurality of pixel sensors in the image sensor. Each image block may include a plurality of pixel values corresponding to each color filter component in the CFA over the image sensor. Each image block of the plurality of image blocks may be one of a 1D image block or a 2D image block. Further, each image block may be a raw image block as each pixel value may correspond to only a single color component without interpolation of other color components. In some embodiments, the captured image may be partitioned into the plurality of image blocks.

In order to encode the plurality of image blocks, the encoder circuitry 206 may be configured to retrieve the plurality of image blocks from the image sensor, such as the image sensor 210. Each image block may include a plurality of pixel values. In other embodiments, the encoder circuitry 206 may be configured to retrieve the plurality of image blocks from the memory, such as the on-chip memory 204.

The encoder circuitry 206 may be configured to determine a value of a selection parameter for each image block of the plurality of image blocks, based on the plurality of pixel values in each image block of the plurality of image blocks. The selection parameter may be a statistical measure that indicates a change of pixel values in the image block. The selection parameter may be indicative of image characteristics or an image quality measure. One example of the selection parameter may be a sum of absolute differences (SAD) between the consecutive pixel values in the image block. In other instances, the selection parameter may be, but is not limited to, variance or standard deviation of the image block. Thus, a value of the SAD may indicate image characteristics and may be utilized for further processing of the plurality of image blocks.

The encoder circuitry 206 may be further configured to select an image block from the plurality of image blocks, which has the value of the selection parameter greater than or equal to a specified threshold value. The specified threshold value may be set, in advance, based on analysis of input image or experimentations. The specified threshold value may be a decision factor to decide whether the image block corresponds to a visually important area or not. The visually relevant area may be a candidate for the application of a gamma correction scheme to improve the image quality.

As an example, a "4×4" image block may have four "4×1" image blocks, shown in Table 1 given below.

TABLE 1

| | 4×4 Image Block | | | |
|---|---|---|---|---|
| | n | | | |
| IB | 1 | 2 | 3 | 4 |
| $IB1_n$ | 200 | 200 | 100 | 150 |
| $IB2_n$ | 100 | 100 | 150 | 160 |
| $IB3_n$ | 200 | 210 | 200 | 200 |
| $IB4_n$ | 300 | 400 | 350 | 300 | where "IB1, IB2, IB3, and IB4" represents the four 4×1 image blocks and "$IB1_n$" represents a pixel value at a position "n" in the "IB1" image block.

Referring to Table 1, as shown above, the value of the selection parameter (e.g. SAD in this case) may be computed by equation (1) as follows:

$$SAD_{IBm} = \sum_{i=1}^{n-1} |IBm_{i+1} - IBm_i| \quad (1)$$

where, "$SAD_{IBm}$" represents the SAD value of the $m^{th}$ image block (IBm) and "$IBm_i$" represents a pixel value in the $m^{th}$ image block at the $i^{th}$ position. The value of "i" ranges from 1 to n−1, where "n" represents the total number of pixel values in the $m^{th}$ image block. For "IB1", the SAD value may be calculated, in accordance with the equation 1, as given below.

SAD=(200−200)+|(100−200)|+(150−100)=150

Similarly, for "IB2. IB3, and IB4" the SAD values may be calculated as shown, for example, in Table 2 below.

TABLE 2

| | SAD values | | | |
|---|---|---|---|---|
| IBm | IB1 | IB2 | IB3 | IB4 |
| $SAD_{IBm}$ | 150 | 60 | 20 | 200 |

Where, "$SAD_{IBm}$" represents a SAD value for the $IBm^{th}$ image block.

In accordance with an embodiment, the threshold value of SAD may be set as "100" (for example). Accordingly, the encoder circuitry 206 may be configured to select "IB1" and "IB4" for the gamma correction, as the SAD value for "IB1" and "IB4" are 150 and 200 respectively (higher than the threshold value 100). Both "IB1" and "IB4" may represent visually more relevant image regions (e.g., regions where there is large pixel difference) as compared to "IB2" and "IB3".

The encoder circuitry 206 may be configured to apply the gamma correction scheme on the selected image blocks (such as "IB1" and "IB4") of the plurality of image blocks. In the gamma correction scheme, each pixel value in the selected image blocks may be adjusted (more specifically, increased), based on a gamma parameter. The input pixel values raised to the power of the gamma parameter may provide the output pixel values. The gamma parameter may be a decision factor to either increase or decrease the input pixel values. For example, the gamma parameter greater than '1' may increase the output pixel values and less than '1' may decrease the output pixel values. In accordance with an embodiment, the value of gamma parameter may be set in advance. In some embodiments, the value of gamma parameter may be specified based on a user input. More specifically, the gamma parameter may indicate a non-linear relationship between input pixel values and output pixel values. A plurality of gamma parameters may be stored, in advance, in the memory (such as the external memory 106 or the on-chip memory 204) corresponding to different input pixel values and output pixel values. Alternatively stated, the memory may store different relationships between input pixel values and output pixel values, which may correspond to the plurality of gamma parameters. The encoder circuitry 206 may be configured to receive the user input that a range of input pixel values, for which a greater number of bits may be required, based on an image application area. For example, in medical related applications, better image quality may be desired for certain input pixel values, which may be specified by the user input as per the requirement. The encoder circuitry 206 may be configured to select a gamma parameter from the plurality of gamma parameters, which may result in maximum output pixel values for the range of input pixel values specified by the user input.

In accordance with an embodiment, the gamma parameter may indicate a non-linear relationship between the input pixel values and the output pixel values. However, when the input pixel values and the output pixel values are plotted on a logarithmic scale, the gamma parameter may be equal to a slope of a linear relationship between the logarithmic input pixel values and the logarithmic output pixel values. The encoder circuitry 206 may be further configured to increase the plurality of pixel values in the selected image blocks (such as "IB1" and "IB4") of the plurality of image blocks based on the gamma parameter. The pixel values in the gamma corrected image block may be computed by equation (2) as follows:

$$GCB_m = (IB_m)^\gamma \qquad (2)$$

where, $GCB_m$ represents the pixel in the gamma corrected image block at $m^{th}$ position, $IB_m$ represents the pixel in the image block at the $m^{th}$ position, and $\gamma$ represents the gamma parameter. For example, the gamma parameter $\gamma$ may be set as '1.2' and the gamma corrected blocks "GCB1" and "GCB4" may be generated corresponding to "IB1" and "IB4". The pixel values for "GCB1" and "GCB4" may be computed based on the equation 2 as follows:

GCB1=[600 600 250 400] and

GCB4=[900 1300 1100 900].

The encoder circuitry 206 may be configured to execute a sequential encoding scheme on the gamma corrected image blocks (such as "GCB1" and "GCB4") and the non-gamma corrected image blocks (such as "IB2" and "IB3") of the plurality of image blocks. The sequential encoding scheme may include, but is not limited to, a quantization scheme followed by an entropy coding scheme. In one implementation, the sequential encoding scheme may include a transform coding scheme, followed by the quantization scheme and the entropy coding scheme. The encoder circuitry 206 may be further configured to generate a bit-stream corresponding to each encoded image block based on the execution of the sequential encoding scheme.

In accordance with an embodiment, the encoder circuitry 206 may be configured to allocate a signaling bit to the bit-stream of each encoded image block. The signaling bit may be allocated as "1" in a case where the encoded image block has been gamma corrected prior to encoding. Otherwise, the signaling bit may be allocated as "0". The signaling bit may be required at the decoder stage, to identify the gamma corrected image block for executing inverse gamma operation. For example, the signaling bits for the image blocks (IB1 to IB4) may be allocated as shown, for example, in Table 3 below.

TABLE 2

| | Signaling bits | | | |
|---|---|---|---|---|
| IBm | IB1 | IB2 | IB3 | IB4 |
| $SB_m$ | 1 | 0 | 0 | 1 | where "$SB_m$" represents a signaling bit allocated for the $IBm^{th}$ image block.

In conventional compression techniques, a raw image block may be directly encoded without any gamma correction. In certain scenarios, there may be degradation of image quality after compression of the raw image block, and the effect of degradation may be more prominent in the raw image block that is visually more relevant (or more visually more distinct or important). In such scenarios, enhancing the pixel value of such raw image block by application of the gamma correction scheme may ensure that after compression the image quality is not affected. As a result, coding artifacts are reduced and overall improvement in encoded image quality is achieved. In accordance with an embodiment, the selective application of the gamma correction scheme on the block level may ensure compression efficiency is significantly improved without an adverse impact on quality of encoded image.

Figure 3:
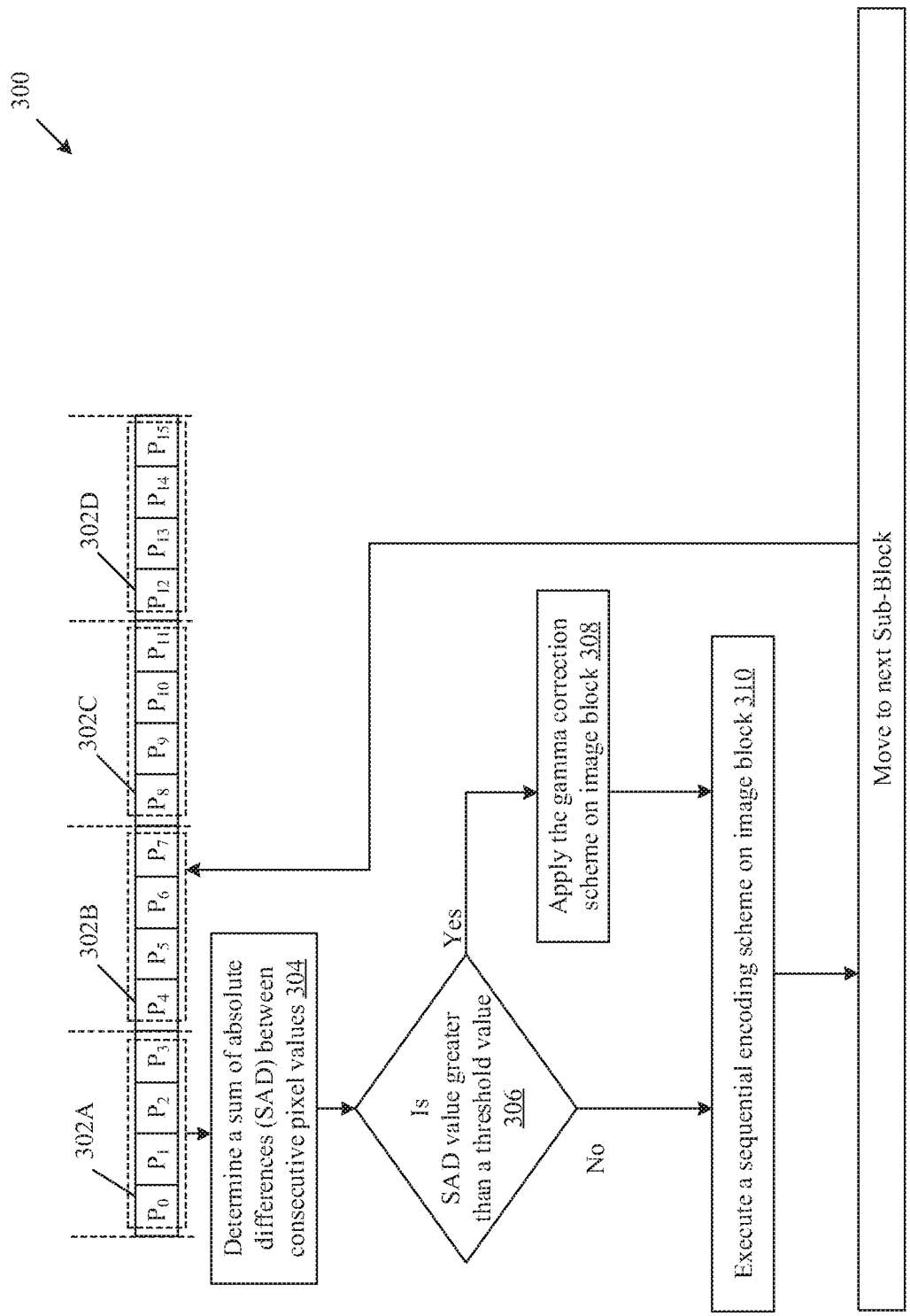
FIG. 3 illustrates selection of image blocks for application of the gamma correction scheme, by the EBC circuitry of FIG. 2, in accordance with an embodiment of the disclosure.

FIG. 3 illustrates selection of image blocks for application of the gamma correction scheme, by the EBC circuitry of FIG. 2, in accordance with an embodiment of the disclosure. FIG. 3 is explained in conjunction with elements from FIG. 1 and FIG. 2. With reference to FIG. 3, there is shown a flow diagram 300. The flow diagram 300 describes certain operations executed by the encoder circuitry 206 while encoding a plurality of image blocks. There is shown a plurality of image blocks, such as an image block 302A, an image block 302B, an image block 302C, and an image block 302D. Each image block may include a plurality of input pixel values, such as $P_0$ to $P_3$ in the image block 302A. Each pixel value may correspond to a single color component (such as 'R', 'G', or 'B' color component in case of the Bayer filter) of the incident light on the image sensor. The encoder circuitry 206 may be configured to sequentially (or in parallel) select an image block (or the plurality of image blocks), such as the image block 302A, and determine whether to apply the gamma correction scheme on the image block or not.

At 304, the encoder circuitry 206 may be configured to determine a value of a selection parameter for the image block 302A. The selection parameter may be a sum of absolute differences between consecutive pixel values of the image block 302A.

At 306, the encoder circuitry 206 may be configured to determine whether the value of the selection parameter for the image block 302A is greater than a threshold value. If the value of the selection parameter for the image block 302A is greater than the threshold value, the image block 302A may be selected for the application of the gamma correction scheme. In a case where the value of the selection parameter is greater than the threshold value, control passes to 308. Otherwise, control passes to 310.

At 308, the encoder circuitry 206 may be configured to apply the gamma correction scheme on the image block 302A. The gamma correction scheme may be applied on the image block 302A to generate a gamma corrected image block. The gamma corrected image block may include pixel values higher than the plurality of input pixel values. A gamma parameter associated with the gamma correction scheme, may determine the amount of increase in the plurality of input pixel values.

At 310, the encoder circuitry 206 may be configured to execute a sequential encoding scheme on the gamma corrected image block, in case where the image block 302A is processed through 308. Otherwise, the encoder circuitry 206 may be configured to execute the sequential encoding scheme directly on the image block 302A. After the image block 302A has been processed, the control may move to the next image block, such as the image block 302B. Similarly, all image blocks such as the image block 302B, 302C, and 302D, may be processed. In some embodiments, the processing of the image blocks 302A to 302D may be executed concurrently.

Figure 4:
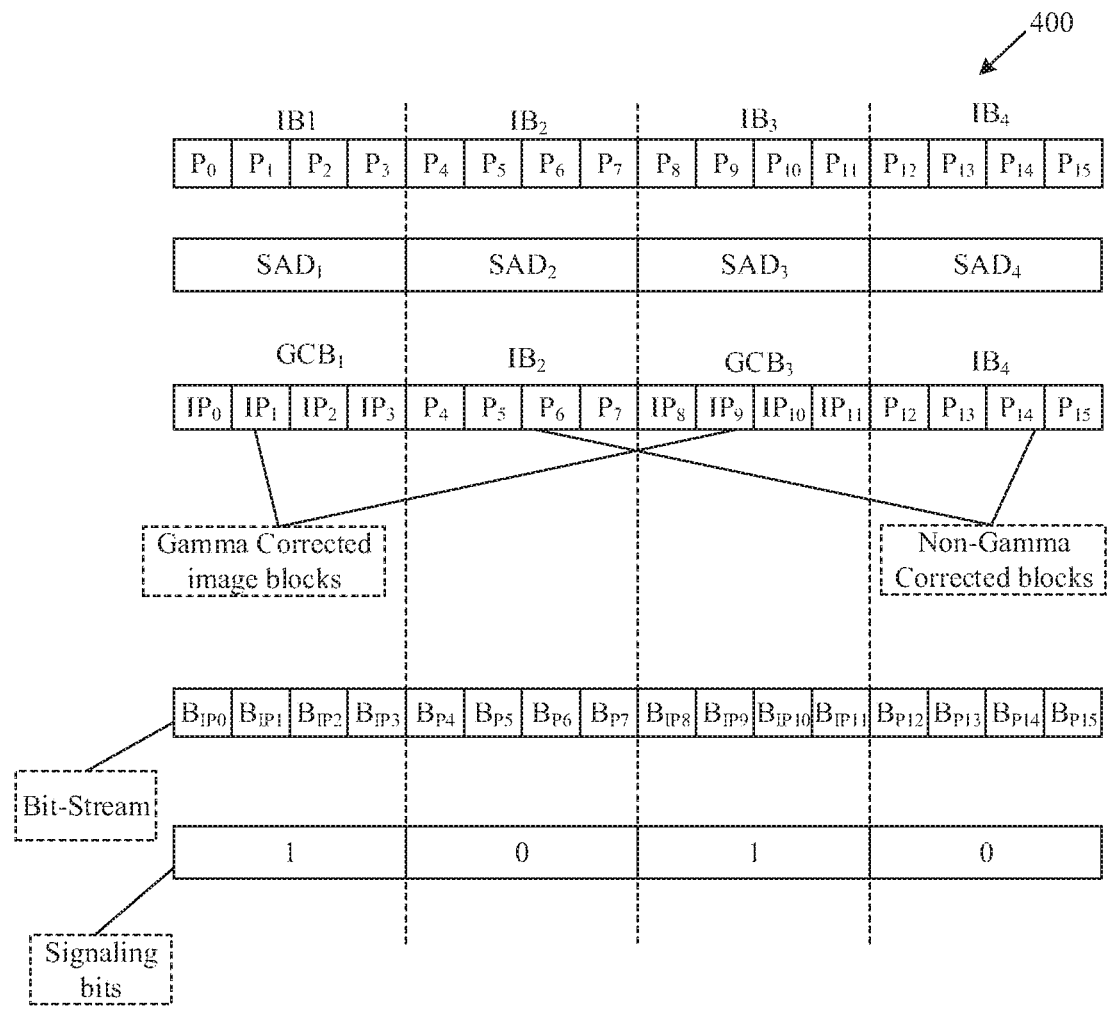
FIG. 4 illustrates selective application of an exemplary gamma correction scheme on a plurality of image blocks by the EBC circuitry of FIG. 2, for block based gamma correction of a raw image block, in accordance with an embodiment of the disclosure.

FIG. 4 illustrates selective application of an exemplary gamma correction scheme on a plurality of image blocks by the EBC circuitry of FIG. 2, for block based gamma correction of a raw image block, in accordance with an embodiment of the disclosure. FIG. 4 is explained in conjunction with elements from FIGS. 1, 2, and 3. With reference to FIG. 4, there is shown a diagram 400 that shows output at different stages of the encoder circuitry 206 while applying a gamma correction scheme, followed by a sequential encoding scheme.

Initially, the encoder circuitry 206 may be configured to retrieve a plurality of image blocks from the memory, such as the on-chip memory 204. The plurality of image blocks may be stored in the memory by a row-wise progressive scan of a pixel array having a color filer array on it. In some embodiments, the plurality of image blocks may be a result of partitioning of an input image. Each image block may include four pixel values, as an example, an image block $IB_1$ includes pixel values $P_0$, $P_1$, $P_2$, and $P_3$. Similarly, $IB_2=[P_4, P_5, P_6, P_7]$, $IB_3=[P_8, P_9, P_{10}, P_{11}]$, and $IB_4=[P_{12}, P_{13}, P_{14}, P_{15}]$. The encoder circuitry 206 may be configured to calculate a sum of absolute differences between consecutive pixel values for each of $IB_1$, $IB_2$, $IB_3$, and $IB_4$. For example, a "$SAD_1$" value may be calculated for "$IB_1$" by adding the absolute differences of "$P_1$, $P_0$", "$P_2$, $P_1$", and "$P_3$, $P_2$". Similarly, "$SAD_2$", "$SAD_3$", and "$SAD_4$" may be calculated for "$IB_2$", "$IB_3$", and "$IB_4$". Thereafter, the encoder circuitry 206 may be configured to determine whether the "$SAD_1$", "$SAD_2$", "$SAD_3$", and "$SAD_4$" values are greater than a threshold value or not. As an example, it may be determined that "$SAD_1$" and "$SAD_3$" are greater than the threshold value, and "$SAD_2$" and "$SAD_4$" are lesser than the threshold value.

The encoder circuitry 206 may be configured to select image blocks "$IB_1$" and "$IB_3$" for the application of gamma correction scheme (e.g. the gamma correction scheme with a gamma parameter equal to '2'), based on the determination that "$SAD_1$" and "$SAD_3$" are greater than the threshold value. The encoder circuitry 206 may be further configured to apply the gamma correction scheme on image blocks "$IB_1$" and "$IB_3$". For example, a gamma corrected block "$GCB_1$" may be generated by the application of the gamma correction scheme on the image block "$IB_1$", which includes increased pixel values $IP_0$, $IP_1$, $IP_2$, and $IP_3$. The increased pixel values $IP_0$, $IP_1$, $IP_2$, and $IP_3$ may be equal to square of the pixel values $P_0$, $P_1$, $P_2$, and $P_3$, based on the gamma parameter equal to '2'. Similarly, $GCB_3=[IP_8, IP_9, IP_{10}, IP_{11}]$ may be generated by the application of the gamma correction scheme on the image block "$IB_3$".

The encoder circuitry 206 may be configured to apply a sequential encoding scheme on the non-gamma corrected image blocks "$IB_2$" and "$IB_4$", and the gamma corrected blocks "$GCB_1$" and "$GCB_3$" to generate a bit-stream. The sequential encoding scheme may include first executing a quantization scheme on the pixel values to generate quantized pixel values, and followed by entropy coding of the quantized pixel values to generate the bit-stream. The bit-stream may be a sequence of entropy coded bits for each pixel value. For example, $GCB_1=[IP_0, IP_1, IP_2, IP_3]$ may be encoded to generate the bit stream with a number of bits $B_{IP0}$ for the pixel value $IP_0$. Similarly, the number of bits for the pixel values $IP_1$, $IP_2$, and $IP_3$ may be $B_{IP1}$, $B_{IP2}$, and $B_{IP3}$. Also, for image blocks "$IB_2$", "$GCB_3$", and "$IB_4$", the number of bits may be "$B_{P4}, B_{P5}, B_{P6}, B_{P7}$", "$B_{IP8}, B_{IP9}, B_{IP10}, B_{IP11}$", and "$B_{P12}, B_{P13}, B_{P14}, B_{P15}$" respectively.

The encoder circuitry 206 may be configured to allocate a signaling bit for each of the "$IB_2$, $IB_4$, $GCB_1$ and $GCB_3$" image blocks. The signaling bit may be allocate as "1" for "$GCB_1$" and "$GCB_3$" to indicate the gamma-corrected blocks. The signaling bit may be allocate as "0" for "$IB_2$" and "$IB_4$" to indicate the non-gamma corrected blocks. The encoder circuitry 206 may be configured to generate header information that may include the signaling bits allocated for "$IB_2$, $IB_4$, $GCB_1$ and $GCB_3$" image blocks.

Figure 5A:
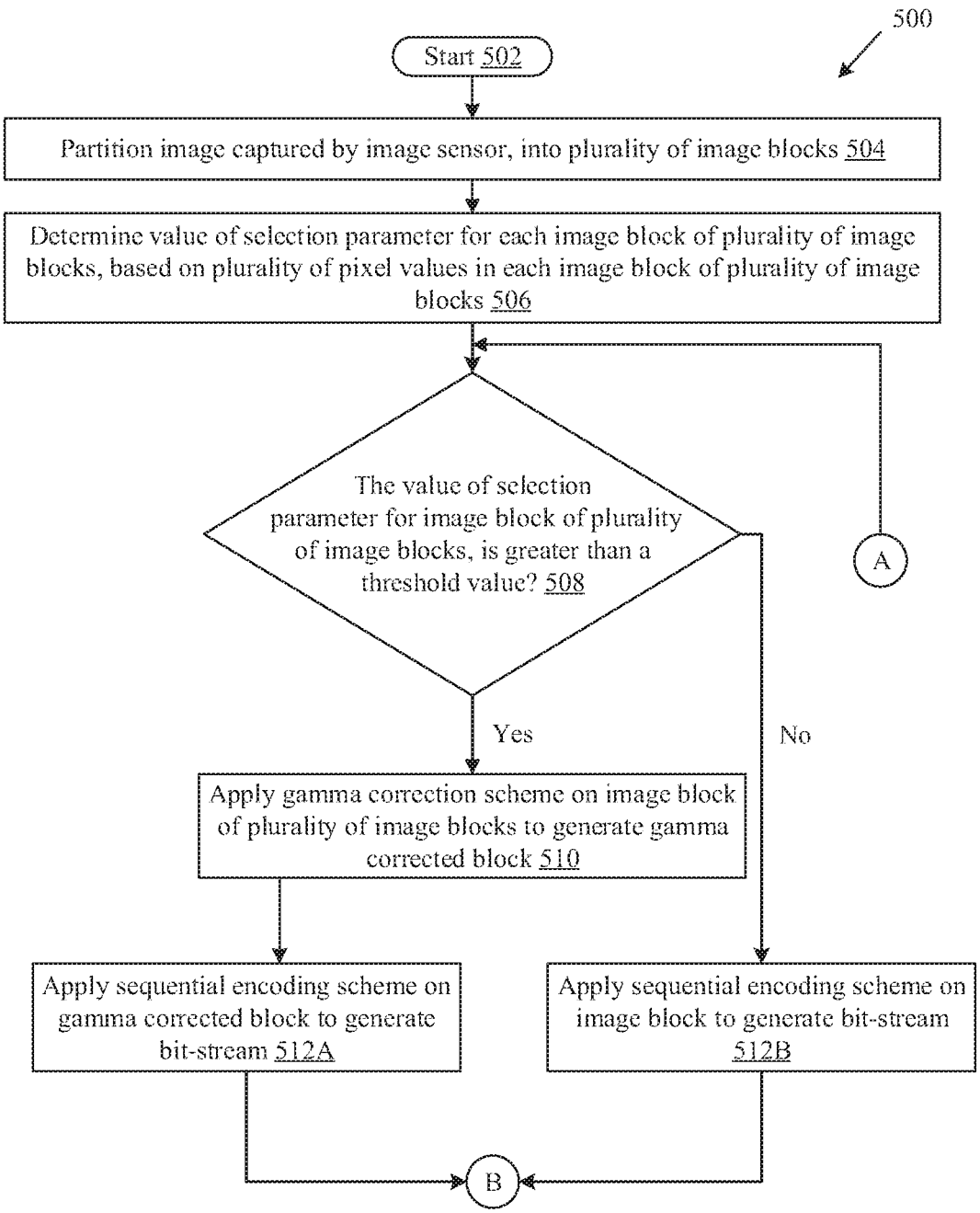
FIGS. 5A and 5B, collectively, depicts a flowchart that illustrates an exemplary method for block based gamma correction of a raw image block, in accordance with an embodiment of the disclosure.
Figure 5B:
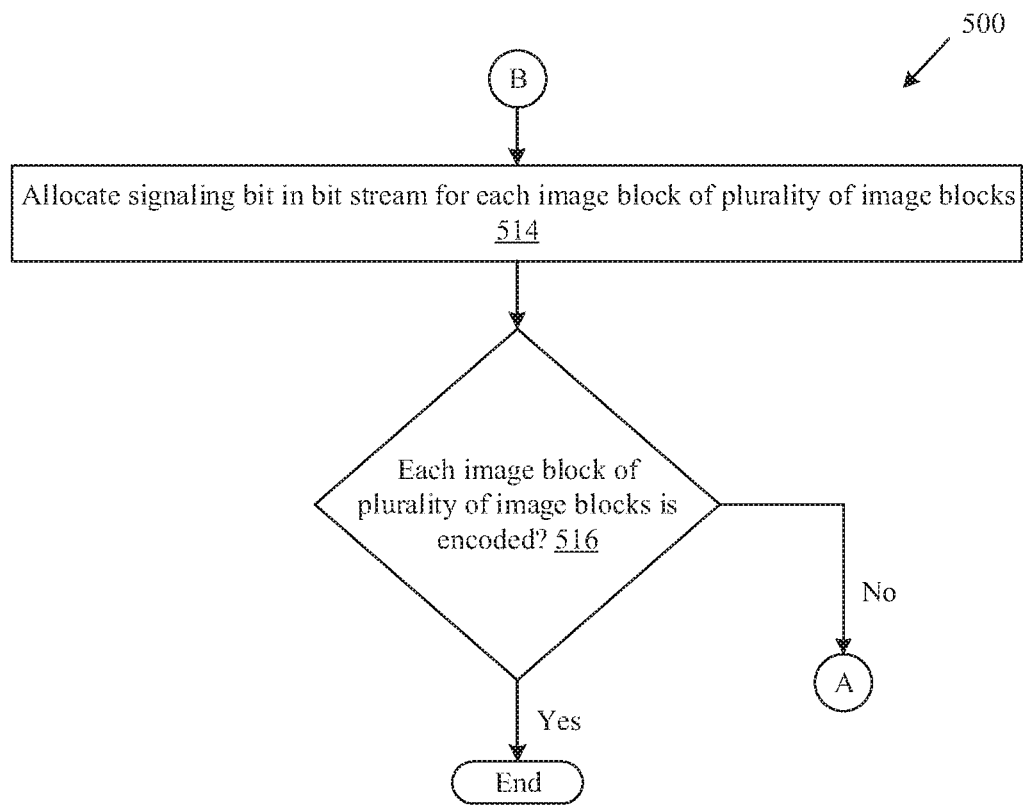

FIGS. 5A and 5B, collectively, depicts a flowchart that illustrates an exemplary method for block based gamma correction of a raw image block, in accordance with an embodiment of the disclosure. FIGS. 5A and 5B are explained in conjunction with elements from FIGS. 1, 2, 3, and 4. With reference to FIGS. 5A and 5B, there is shown a flowchart 500 implemented in the EBC circuitry 108. The method starts at 502 and proceeds to 504.

At 504, an image captured by an image sensor, may be partitioned into a plurality of image blocks. Each image block of the plurality of image blocks may include a plurality of pixel values. The encoder circuitry 206 may be configured to partition the image captured by the image sensor, into a plurality of image blocks.

At 506, a value of a selection parameter may be determined for each image block of the plurality of image blocks, based on the plurality of pixel values in each image block of the plurality of image blocks. The encoder circuitry 206 may be configured to determine the value of the selection parameter for each image block of the plurality of image blocks, based on the plurality of pixel values in each image block of the plurality of image blocks.

At 508, it may be determined whether the value of the selection parameter for an image block of the plurality of image blocks, is greater than a threshold value. The encoder circuitry 206 may be configured to determine whether the value of the selection parameter for the image block of the plurality of image blocks, is greater than the threshold value. In a case where the value of the selection parameter for the image block of the plurality of image blocks, is greater than the threshold value, then the control passes to 510, or else the control passes to 512B.

At 510, a gamma correction scheme may be applied on the image block of the plurality of image blocks to generate a gamma corrected block. In the gamma correction scheme, the plurality of pixel values in the image block may be increased based on a gamma parameter. The encoder circuitry 206 may be configured to apply a gamma correction scheme on the image block of the plurality of image blocks to generate the gamma corrected block.

At 512A, a sequential encoding scheme may be applied on the gamma corrected block to generate a bit-stream. The encoder circuitry 206 may be configured to apply the sequential encoding scheme on the gamma corrected block to generate the bit-stream.

At 512B, the sequential encoding scheme may be applied on the image block to generate the bit-stream. The encoder circuitry 206 may be configured to apply the sequential encoding scheme on the image block to generate the bit-stream.

At 514, a signaling bit may be allocated in the bit stream for each image block of the plurality of image blocks. The signaling bit may be allocated as "1" for the gamma corrected block. The encoder circuitry 206 may be configured to allocate the signaling bit in the bit stream for each image block of the plurality of image blocks. At 516, it may be determined whether each image block of the plurality of image blocks is encoded. The encoder circuitry 206 may be configured to determine whether each image block of the plurality of image blocks is encoded. In cases each image block of the plurality of image blocks is encoded, then the control passes to end, or else the control passes to 508.

Certain embodiments of the disclosure may be found in an embedded codec (EBC) circuitry (e.g., the EBC circuitry 108 (FIG. 1)). Various embodiments of the disclosure may provide the EBC circuitry that may include encoder circuitry (e.g., the encoder circuitry 206 (FIG. 2)). The encoder circuitry may be configured to determine a value of a selection parameter, which is indicative of image characteristics, for each image block of a plurality of image blocks (e.g., the image blocks 302A, 302B, 302C, and 302D (FIG. 3)), based on a plurality of input pixel values in each image block of the plurality of image blocks. In one or more embodiments, each image block of the plurality of image blocks may be one of a 1D image block or a 2D image block. The plurality of image blocks may correspond to an input image. The encoder circuitry may be further configured to select a first image block from the plurality of image blocks, based on the value of the selection parameter of the first image block. The value of the selection parameter of the first image block greater than a threshold value may indicate that the first image block is a candidate for gamma correction. The encoder circuitry may be further configured to generate a gamma corrected image block (e.g., the gamma corrected block $GCB_1$ (FIG. 4)) by application of a gamma correction scheme on the selected first image block. The application of the gamma correction scheme may increase a number of bits required to encode the plurality of input pixel values in the selected first image block as compared to a non-selected first image block. The encoder circuitry may be further configured to generate a first bit-stream of the gamma corrected image block by application of an encoding scheme on the gamma corrected image block.

In accordance with an embodiment, the EBC circuitry may further include an image sensor (e.g., the image sensor 210 (FIG. 2)) and a color filter array on the image sensor. The image sensor may be configured to capture the input image. The color filter array may comprise a plurality of filter components that may correspond to a plurality of color components in a color space of the input image. Each filter component of the plurality of filter components may be on a pixel circuit of the image sensor. The color filter array may be a Bayer filter that may comprise the plurality of filter components. The plurality of filter components may comprise a plurality of "2×2" blocks on the image sensor. Each "2×2" block of the plurality of "2×2" blocks may comprise a pair of green filter components, a red filter component, and a blue filter component.

In accordance with an embodiment, the encoder circuitry may be further configured to partition the input image into the plurality of image blocks. The input image may be captured by an image sensor with a color filter array on the image sensor.

In accordance with an embodiment, each image block of the plurality of image blocks may comprise the plurality of input pixel values. Each input pixel value of the plurality of input pixel values may correspond to a color component of a plurality of color components in a color space of the input image.

In accordance with an embodiment, the input image may be a raw Bayer image that may correspond to a Bayer filter arrangement on an image sensor. The image sensor may be configured to capture the raw Bayer image.

The selection parameter may be based on the plurality of input pixel values in each image block of the plurality of image blocks. In accordance with an embodiment, the selection parameter may be a sum of absolute differences (SAD) between a pair of consecutive input pixel values of the plurality of input pixel values in the first image block.

In accordance with an embodiment, the encoder circuitry may be further configured to select a second image block from the plurality of image blocks, based on a value of the selection parameter of the second image block. The value of the selection parameter of the second image block less than the threshold value may indicate that the second image block is not the candidate for the gamma correction. The encoder circuitry may be further configured to generate a second bit-stream of the second image block by application of the encoding scheme on the second image block. The encoder circuitry may be further configured to allocate a signaling bit to the second bit-stream. The signaling bit may be allocated as a binary '0' value that may indicate a non-gamma corrected image block.

In accordance with an embodiment, the encoder circuitry may be configured to allocate a signaling bit to the first bit-stream. The signaling bit may be allocated as a binary '1' value that may indicate the gamma corrected image block.

In accordance with an embodiment, the encoder circuitry may be further configured to modify the plurality of input pixel values in the first image block, based on a value of a gamma parameter specified in the gamma correction scheme. The gamma parameter may correspond to a relationship between the plurality of input pixel values and the modified plurality of input pixel values. The encoder circuitry may be further configured to increase the plurality of input pixel values in the first image block, based on the value of the gamma parameter. The encoder circuitry may be further configured to generate the gamma corrected image block that may comprise the increased plurality of input pixel values. The increased plurality of input pixel values may include a set of pixel values that may be greater than the plurality of input pixel values. The encoder circuitry may be further configured to receive a range of input pixel values based on a user input. The range of input pixel values may correspond to a region of the input image. The encoder circuitry may be further configured to set the value of the gamma parameter based on the received range of input pixel values.

In accordance with an embodiment, the encoding scheme may comprise a sequential application of quantization, followed by an entropy coding scheme on the gamma corrected image block.

In accordance with an embodiment, the encoder circuitry may be further configured to apply, on a second image block of the plurality of image blocks, one of the gamma correction scheme followed by the encoding scheme, or the encoding scheme, based on the value of the selection parameter for the second image block.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
   encoder circuitry configured to:
   determine a value of a selection parameter which is indicative of image characteristics, for each image block of a plurality of image blocks, based on a plurality of input pixel values in each image block of the plurality of image blocks, wherein the plurality of image blocks corresponds to an input image;
   select a first image block from the plurality of image blocks, based on the value of the selection parameter of the first image block, wherein the value of the selection parameter of the first image block greater than a threshold value indicates that the first image block is a candidate for gamma correction;
   generate a gamma corrected image block by application of a gamma correction scheme on the selected first image block, wherein the application of the gamma correction scheme increases a number of bits required to encode the plurality of input pixel values in the selected first image block; and
   generate a first bit-stream of the gamma corrected image block by application of an encoding scheme on the gamma corrected image block.

2. The EBC circuitry according to claim 1, further comprising:
   an image sensor; and
   a color filter array (CFA) on the image sensor,
   wherein the CFA comprises a plurality of filter components that corresponds to a plurality of color components in a color space of the input image,
   wherein each filter component of the plurality of filter components is on a pixel circuit of the image sensor, and
   wherein the image sensor is configured to capture the input image.

3. The EBC circuitry according to claim 2,
   wherein the CFA is a Bayer filter that comprises the plurality of filter components,
   wherein the plurality of filter components comprises a plurality of "2×2" blocks on the image sensor, and
   wherein each "2×2" block of the plurality of "2×2" blocks comprises a pair of green filter components, a red filter component, and a blue filter component.

4. The EBC circuitry according to claim 1, wherein the encoder circuitry is further configured to partition the input image into the plurality of image blocks.

5. The EBC circuitry according to claim 1, wherein each image block of the plurality of image blocks comprises the plurality of input pixel values, and wherein each input pixel value of the plurality of input pixel values corresponds to a color component of a plurality of color components in a color space of the input image.

6. The EBC circuitry according to claim 1, wherein the input image is a raw Bayer image that corresponds to a Bayer filter arrangement on an image sensor, and wherein the image sensor is configured to capture the raw Bayer image.

7. The EBC circuitry according to claim 1, wherein the selection parameter is based on the plurality of input pixel values in each image block of the plurality of image blocks.

8. The EBC circuitry according to claim 1, wherein the selection parameter is a sum of absolute differences (SAD) between a pair of consecutive input pixel values of the plurality of input pixel values in the first image block.

9. The EBC circuitry according to claim 1, wherein the encoder circuitry is further configured to:
   select a second image block from the plurality of image blocks, based on a value of the selection parameter of the second image block, wherein the value of the selection parameter of the second image block less than the threshold value indicates that the second image block is not the candidate for the gamma correction; and
   generate a second bit-stream of the second image block by application of the encoding scheme on the second image block.

10. The EBC circuitry according to claim 9, the encoder circuitry is further configured to allocate a signaling bit to the second bit-stream, wherein the signaling bit is allocated as a binary '0' value that indicates a non-gamma corrected image block.

11. The EBC circuitry according to claim 1, the encoder circuitry is further configured to allocate a signaling bit to the first bit-stream, wherein the signaling bit is allocated as a binary '1' value that indicates the gamma corrected image block.

12. The EBC circuitry according to claim 1, wherein the encoder circuitry is further configured to:
    modify the plurality of input pixel values in the first image block, based on a value of a gamma parameter specified in the gamma correction scheme, wherein the gamma parameter corresponds to a relationship between the plurality of input pixel values and the modified plurality of input pixel values.

13. The EBC circuitry according to claim 12, wherein the encoder circuitry is further configured to:
    increase the plurality of input pixel values in the first image block, based on the value of the gamma parameter; and
    generate the gamma corrected image block that comprises the increased plurality of input pixel values, wherein the increased plurality of input pixel values includes a set of pixel values that are greater than the plurality of input pixel values.

14. The EBC circuitry according to claim 12, wherein the encoder circuitry is further configured to:
    receive a range of input pixel values based on a user input, wherein the range of input pixel values corresponds to a region of the input image; and
    set the value of the gamma parameter based on the received range of input pixel values.

15. The EBC circuitry according to claim 1, wherein the encoding scheme comprises a sequential application of quantization, followed by an entropy coding scheme on the gamma corrected image block.

16. The EBC circuitry according to claim 1, wherein the encoder circuitry is further configured to apply, on a second image block of the plurality of image blocks, one of:
    the gamma correction scheme followed by the encoding scheme; or
    the encoding scheme,
    based on the value of the selection parameter for the second image block.

17. The EBC circuitry according to claim 1, wherein each image block of the plurality of image blocks is one of a one-dimensional (1D) image block or a two-dimensional (2D) image block.

18. A method, comprising:
    in an embedded codec (EBC) circuitry:
        determining a value of a selection parameter, which is indicative of image characteristics, for each image block of a plurality of image blocks, based on a plurality of input pixel values in each image block of the plurality of image blocks, wherein the plurality of image blocks corresponds to an input image;
        selecting a first image block from the plurality of image blocks, based on the value of the selection parameter of the first image block, wherein the value of the selection parameter of the first image block greater than a threshold value indicates that the first image block is a candidate for gamma correction;
        generating a gamma corrected image block by the application of a gamma correction scheme on the selected first image block, wherein the application of the gamma correction scheme increases a number of bits required to encode the plurality of input pixel values in the selected first image block as compared to a non-selected first image block; and
        generating a first bit-stream of the gamma corrected image block by application of an encoding scheme on the gamma corrected image block.

19. The method according to claim 18, wherein the selection parameter is a sum of absolute differences (SAD) between a pair of consecutive input pixel values of the plurality of input pixel values in the first image block.

20. The method according to claim 18, further comprising:
    selecting a second image block from the plurality of image blocks, based on a value of the selection parameter of the second image block, wherein the value of the selection parameter of the second image block less than the threshold value indicates that the second image block is not the candidate for the gamma correction; and
    generating a second bit-stream of the second image block by application of the encoding scheme on the second image block.

* * * * *